(12) United States Patent
Pfeiffer et al.

(10) Patent No.: US 8,170,763 B2
(45) Date of Patent: May 1, 2012

(54) METHOD FOR CONTROLLING A DRIVE SYSTEM AND/OR WHEEL BRAKING SYSTEM

(75) Inventors: Andreas Pfeiffer, Holzkirchen (DE); Peter Wanner, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 586 days.

(21) Appl. No.: 11/961,959

(22) Filed: Dec. 20, 2007

(65) Prior Publication Data

US 2008/0097676 A1 Apr. 24, 2008

Related U.S. Application Data

(63) Continuation of application No. PCT/EP2006/005919, filed on Jun. 20, 2006.

(30) Foreign Application Priority Data

Jun. 25, 2005 (DE) .................. 10 2005 029 528

(51) Int. Cl.
*B60W 10/04* (2006.01)
(52) U.S. Cl. .................. 701/70; 701/93; 477/185
(58) Field of Classification Search .................. 701/70, 701/93, 94, 95, 96, 78, 79, 81, 83; 477/183, 477/184, 185, 187, 188, 203, 204, 205; 303/155
See application file for complete search history.

(56) References Cited

U.S. PATENT DOCUMENTS

| | | | | |
|---|---|---|---|---|
| 5,441,335 | A | * | 8/1995 | Stumpe et al. .................. 303/3 |
| 5,514,050 | A | * | 5/1996 | Bauerle et al. ................ 477/118 |
| 6,062,658 | A | | 5/2000 | Stumpe et al. |
| 6,283,240 | B1 | * | 9/2001 | Beever ......................... 180/178 |
| 6,912,457 | B2 | | 6/2005 | Schuster et al. |
| 6,915,201 | B1 | | 7/2005 | Ott et al. |
| 2004/0119333 | A1 | | 6/2004 | Hackl |

FOREIGN PATENT DOCUMENTS

| | | |
|---|---|---|
| DE | 37 36 807 A1 | 5/1989 |
| DE | 42 07 965 A1 | 9/1993 |
| DE | 43 30 391 A1 | 10/1994 |
| DE | 196 04 391 A1 | 8/1997 |
| DE | 199 25 368 A1 | 12/2000 |
| DE | 100 39 457 A1 | 7/2001 |
| DE | 101 55 204 A1 | 5/2003 |
| DE | 102 35 472 A1 | 2/2004 |
| DE | 10 2004 003 072 A1 | 8/2005 |
| EP | 0 983 894 A2 | 3/2000 |
| EP | 1 288 056 A2 | 3/2003 |

OTHER PUBLICATIONS

International Search Report dated Oct. 6, 2006 including English translation (Six (6) pages).
German Search Report dated Dec. 28, 2005 including English translation of relevant portion (Nine (9) pages).

* cited by examiner

*Primary Examiner* — Khoi Tran
*Assistant Examiner* — Spencer Patton
(74) *Attorney, Agent, or Firm* — Crowell & Moring LLP

(57) ABSTRACT

A method is provided for controlling a drive system and/or a wheel braking system of a vehicle, in which a total braking power to be exerted on the wheels of a motor vehicle is composed of a drive braking power and/or a wheel braking power. The instantaneously set drive braking power is frozen when, starting from a steady state operating mode, the gradient of the required total braking power exceeds a predetermined threshold.

13 Claims, 1 Drawing Sheet

For the case that the gradient of $P_{total\_wheel\_setpoint} < S$:

For the case that the gradient of $P_{total\_wheel\_setpoint} > S$:

METHOD FOR CONTROLLING A DRIVE SYSTEM AND/OR WHEEL BRAKING SYSTEM

CROSS-REFERENCE TO RELATED APPLICATIONS

This application is a continuation of PCT International Application No. PCT/EP2006/005919, filed on Jun. 20, 2006, which claims priority under 35 U.S.C. §119 to German Application No. 10 2005 029 528.2, filed Jun. 25, 2005, the entire disclosures of which are expressly incorporated by reference herein.

BACKGROUND AND SUMMARY OF THE INVENTION

The invention relates to a method for controlling a drive system and/or a wheel braking system of a vehicle.

For motor vehicles having driver assistance systems by which, in particular, a predetermined speed or a predetermined distance from the vehicle traveling ahead is to be held constant, methods are known for controlling a drive system and/or a wheel braking system to achieve the driver assistance objectives. In this regard, however, problems continually arise, in particular for downhill travel. Either the wheel braking systems become very hot, or actions of the drive system, such as downshifting of the automatic transmission or changing the type of overrun mode (fired/unfired), result in sacrifices in comfort.

The invention provides an improved method for controlling a drive system and/or a wheel braking system, in particular for downhill travel, with regard to comfort, while at the same time taking into account a reduction in the load on the wheel braking system.

According to the invention, a method for controlling a drive system and/or a wheel braking system of a vehicle, in which a total brake power ($P_{total\_wheel\_setpoint}$) to be exerted on the wheels of a motor vehicle is composed of a drive braking power ($P_{drive\_wheel\_setpoint}$) and/or a wheel braking power ($P_{brake\_wheel\_setpoint}$), is characterized in that the instantaneously set drive braking power ($P_{drive\_wheel\_actual}$) or the instantaneously specified drive braking power ($P_{drive\_wheel\_setpoint}$) is frozen when, starting from a steady state operating mode, the gradient of the required total braking power ($P_{total\_wheel\_setpoint}$) exceeds a predetermined threshold (S). Advantageous refinements of the invention are described and claimed herein.

For downhill travel, the invention is used in particular when, starting from a steady state operating mode, i.e., in particular for travel at an approximately constant speed, an intention to decelerate occurs, as the result of which the required total braking power instantaneously changes in a relatively intense manner. Such an intention to decelerate may be provided either by the driver via manual adjustment of the specified vehicle speed, or by the system itself when the distance from the vehicle traveling ahead drops below a predetermined value.

The total braking power may be specified, for example, by the driver's intent, determined by an interpretation of a brake and/or accelerator pedal, or by a driver assistance system (cruise control, ACC, etc.). The invention is particularly advantageous when used in motor vehicles having driver assistance systems based on the principle of maintaining a constant predetermined speed.

The wheel braking power is the proportion of the total braking power exerted on the wheels, which is performed by the wheel braking system.

The drive braking power is, preferably, the proportion of the total braking power exerted on the wheels, which is performed by the total drive system including at least one engine and a transmission, whereby both the engine and the transmission may be electronically controllable.

The present invention prevents uncomfortable transmission downshifting and/or abrupt changes in engine torque as the result of the transition from unfired to fired overrun mode, and vice versa.

Other objects, advantages and novel features of the present invention will become apparent from the following detailed description of the invention when considered in conjunction with the accompanying drawings.

BRIEF DESCRIPTION OF THE DRAWINGS

The drawings illustrate one exemplary embodiment of the invention. For the case that the total braking power is specified by a driver assistance system as the setpoint value, the drawings show the following.

DETAILED DESCRIPTION OF THE DRAWINGS

It is an objective increase comfort by taking into account driving conditions in which abrupt changes in wheel power are particularly noticeable to the driver. Tests have shown that changes, in particular abrupt changes, such as those occurring during gear shifting or when a change is made from fired to unfired overrun mode and vice versa, in the course of increasing the drive braking power may have a particularly disadvantageous effect on the comfort level in non steady state operating mode. It is also an objective to reduce load on the brakes. The aim in principle is to set the highest possible drive braking power while taking into account demands on the drive system for relieving load on the wheel braking system. In this manner the increase in the drive braking power may proceed in any given manner, and preferably may always be set at the maximum possible level.

Figure 1:
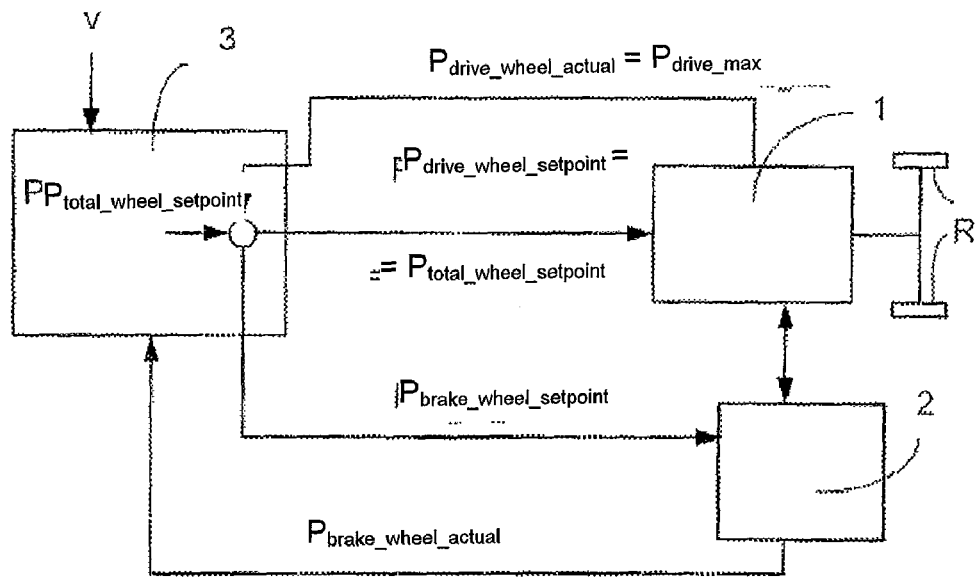
FIG. 1 is a schematic diagram of one possible operating mode according to the invention for a composite vehicle system for setting the total braking power when the drive braking power is at a maximum.
Figure 2:
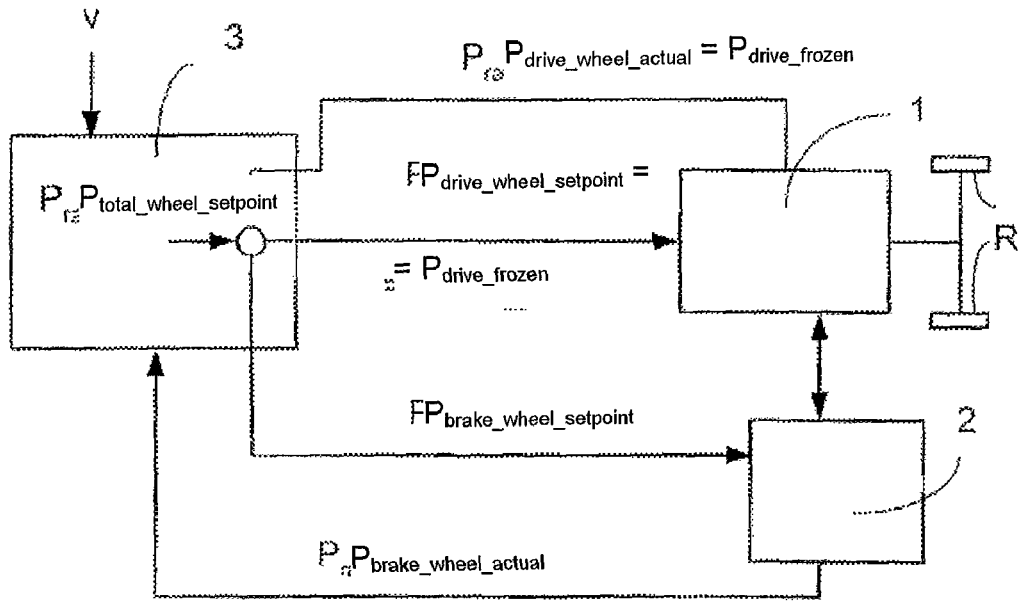
FIG. 2 is a schematic diagram of one possible operating mode according to the invention for a composite vehicle system for setting the total braking power when the drive braking power is frozen.

FIGS. 1 and 2 each show a composite vehicle system having a drive system 1, a wheel braking system 2, and a driver assistance system 3. Systems 1 through 3 have, for example, respective electronic control devices, which are typically connected to one another via data bus systems. The method according to the invention may be carried out by at least one of these control devices.

In the present exemplary embodiment, in order to maintain a constant predetermined setpoint vehicle speed, the driver assistance system 3 is designed to specify a total braking power $P_{total\_wheel\_setpoint}$ that is necessary for this purpose. The total braking power $P_{total\_wheel\_setpoint}$ corresponds to the wheel power acting on the drive wheels R.

The total braking power ($P_{total\_wheel\_setpoint}$) to be exerted on the wheels R of a motor vehicle may, in principle, be composed of a drive braking power ($P_{drive\_wheel\_setpoint}$) and/or a wheel braking power ($P_{brake\_wheel\_setpoint}$). In the present case, the actual wheel braking power $P_{brake\_wheel\_actual}$ is determined by the driver assistance system 3 and is monitored with respect to the load on the wheel braking system.

When downhill travel is detected and the change in vehicle speed v has not exceeded a tolerance range of zero, and thus steady state operation is detected, a maximum possible drive braking power $P_{drive\_wheel\_setpoint}$ is preferably set. The setpoint wheel braking power $P_{brake\_wheel\_setpoint}$ results from the difference between the total braking power $P_{total\_wheel\_setpoint}$ and the actual drive braking power $P_{drive\_wheel\_actual}$. To this end, the control device for the driver assistance system 3 outputs a request to a control device for the drive system 1, in which the total braking power $P_{total\_wheel\_setpoint}$ is output as the setpoint drive braking power $P_{drive\_wheel\_setpoint}$. The drive system 1 decides, based on additional operating parameters, which maximum possible drive braking power $P_{drive\_max}$ is set in each case. The resulting actual drive braking power $P_{drive\_wheel\_actual}$ is communicated to the control device for the driver assistance system 3. The control device for the driver assistance system 3 generates the difference between the total braking power $P_{total\_wheel\_setpoint}$ and the actual drive braking power $P_{drive\_wheel\_actual}$, and outputs this difference as the setpoint wheel braking power $P_{brake\_wheel\_setpoint}$ to the control device for the wheel braking system 2 (FIG. 1). The generation of the difference and the outputting of the setpoint wheel braking power $P_{brake\_wheel\_setpoint}$ could also be performed by a control device for the drive system 1.

This operation takes place until the gradient of the required total braking power $P_{total\_wheel\_setpoint}$ exceeds a predetermined threshold S (FIG. 2). In this case, the instantaneously set drive braking power ($P_{drive\_wheel\_actual}$) or the instantaneously specified drive braking power ($P_{drive\_wheel\_setpoint}$) is frozen; i.e., the instantaneously set transmission gear is maintained and the instantaneously set engine torque is not changed. To this end, the control device for the driver assistance system 3 outputs a request to the control device for the drive system 1, in which the actual drive braking power to be frozen is output as the setpoint drive braking power ($P_{drive\_wheel\_setpoint} = P_{drive\_frozen}$). The setpoint drive braking power $P_{drive\_wheel\_setpoint}$ is then held constant until, for example, the gradient of the total braking power $P_{total\_wheel\_setpoint}$ again drops below the predetermined threshold S. In this regard, hysteresis may be provided to prevent constant changing of the operating modes. The drive system 1 complies with this request. The control device for the driver assistance system 3 generates the difference between the total braking power $P_{total\_wheel\_setpoint}$ and the fixedly frozen setpoint drive braking power, and outputs this difference as the setpoint wheel braking power $P_{brake\_wheel\_setpoint}$ to the control device for the wheel braking system 2.

The change in the gradient of the total braking power $P_{total\_wheel\_setpoint}$ occurs, in particular, as the result of an intention to decelerate.

It is further noted that the gradient monitoring in the steady state operation may be carried out based not only on power, but also based on wheel torque in an equivalent manner, since at approximately constant vehicle speed a wheel torque is present which is proportional to the power. Lastly, the power to be set in each case may also be specified in the form of a wheel torque at the moment of control of the setting of the actuators, which is necessary for this purpose.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling at least one of a drive system and a wheel braking system of a motor vehicle, in which a total brake power (Ptotal_wheel_setpoint) to be exerted on wheels of the motor vehicle is composed of at least a drive braking power (Pdrive_wheel_setpoint) and a wheel braking power (Pbrake_wheel_setpoint), the method comprising the acts of:
   starting from a steady state operating mode, determining if a gradient of a required total braking power (Ptotal_wheel_setpoint) exceeds a defined threshold (S); and
   freezing one of an instantaneous actual drive braking power (Pdrive_wheel_actual) and an instantaneously specified drive braking power (Pdrive_wheel_setpoint) in response to determining that the gradient of the required total braking power exceeds the defined threshold, wherein freezing is performed by maintaining the one of the instantaneous actual drive braking power (Pdrive_wheel_actual) and the instantaneously specified drive braking power (Pdrive_wheel_setpoint) constant at a value held when the gradient exceeds the defined threshold.

2. The method according to claim 1, wherein to achieve the total braking power (Ptotal_wheel_setpoint), the method further comprising the acts of:
   setting, in principle, a maximum possible drive braking power (Pdrive_max); and
   setting as the wheel braking power (Pbrake_wheel_setpoint) the difference between the total braking power (Ptotal_wheel_setpoint) and the maximum possible drive braking power (Pdrive_max) as long as the gradient of the required total braking power (Ptotal_wheel_setpoint) has not exceeded the specified threshold value (S).

3. The method according to claim 2, wherein the steady state operating mode is defined at least by one trip at a vehicle speed (v) which is held approximately constant.

4. The method according to claim 3, wherein the method is used in downhill travel.

5. The method according to claim 4, wherein the downhill travel is detected by a longitudinal acceleration sensor.

6. The method according to claim 2, wherein the method is used in downhill travel.

7. The method according to claim 6, wherein the downhill travel is detected by a longitudinal acceleration sensor.

8. The method according to claim 1, wherein the steady state operating mode is defined at least by one trip at a vehicle speed (v) which is held approximately constant.

9. The method according to claim 8, wherein the method is used in downhill travel.

10. The method according to claim 9, wherein the downhill travel is detected by a longitudinal acceleration sensor.

11. The method according to claim 1, wherein the method is used in downhill travel.

12. The method according to claim 11, wherein the downhill travel is detected by a longitudinal acceleration sensor.

13. The method according to claim 1, wherein performing freezing one of the instantaneous actual drive braking power and the instantaneously specified drive braking power further comprises maintaining an instantaneously set transmission gear ratio at a constant value and maintaining an instantaneously set engine torque at constant value in response to determining that the gradient of the required total braking power exceeds the defined threshold.

* * * * *